INVENTOR.
JAMES F. MANN
BY Roy Mattern Jr.
ATTORNEY

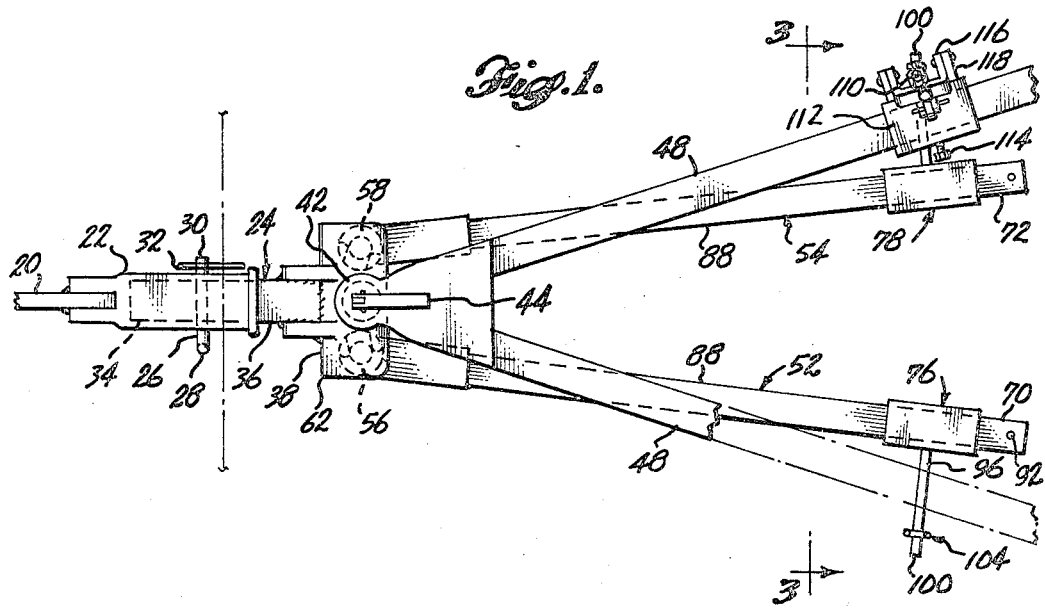
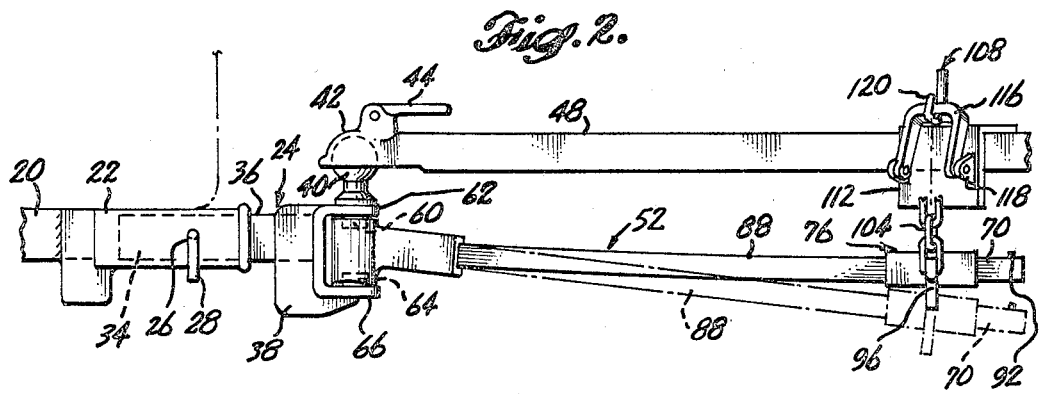
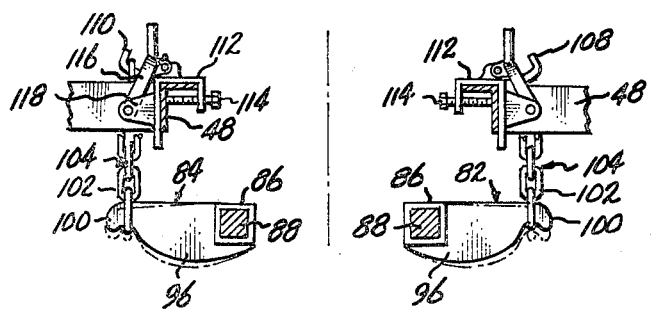

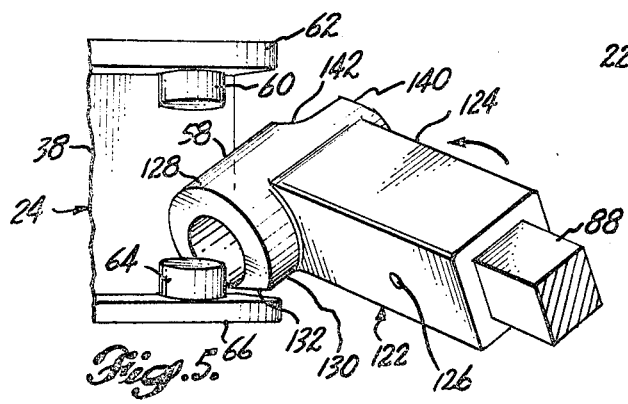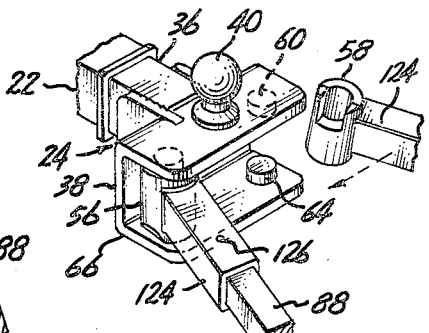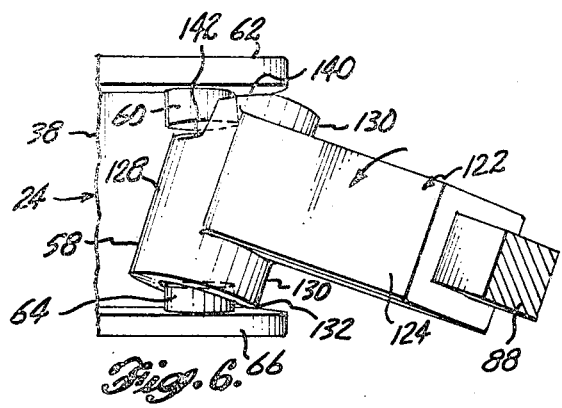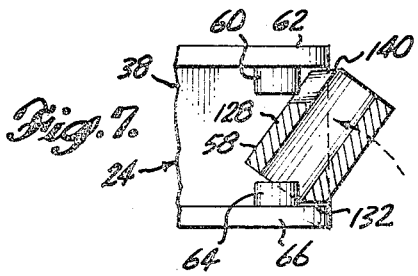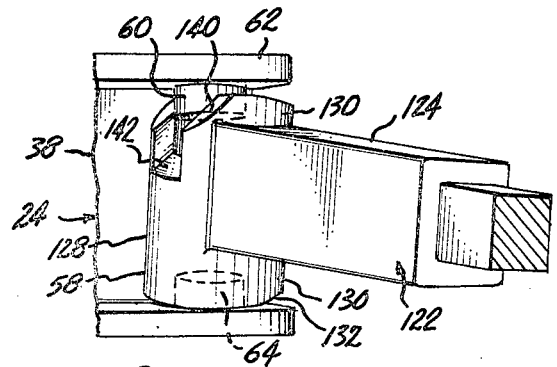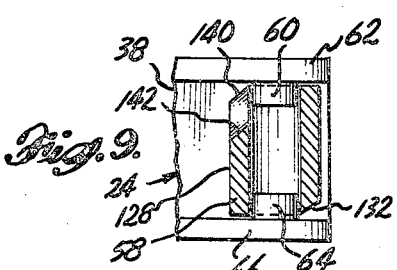

United States Patent Office 3,490,788
Patented Jan. 20, 1970

3,490,788
TRAILER HITCH
James F. Mann, 10507 E. Harrison,
Tacoma, Wash. 98445
Filed Sept. 18, 1967, Ser. No. 668,332
Int. Cl. B60d 1/06
U.S. Cl. 280—406          8 Claims

ABSTRACT OF THE DISCLOSURE

A trailer hitch joins a towing vehicle to a towed vehicle readjusting overall weights of these vehicles by utilizing an overall combination of parts and sub-assemblies of these parts to obtain better control of sway and rocking characteristics, improved tight turn capabilities, and a more convenient and safer installation. In one embodiment the overall trailer hitch comprises: a ball mount interconnector having respective means for attachment to a towing vehicle, equalizing torsion bar-arm assemblies, a ball and a socket; a ball secured to the interconnector; a ball socket secured to the tongue of the towed vehicle; equalizing spring torsion bar-arm assemblies having torque lever bodies; and adjustable tensioning means for these spring-torsion bar-arm assemblies.

PRIOR ART

Trailer hitches commonly referred to as equalizing hitches are described in patents such as U.S. Patents 2,808,272; 2,817,541; and 3,194,584. An inventor of the trailer hitches described in Patents 2,808,272 and 3,194,584, Mr. Terrell J. Reese, further discussed his equalizing hitches and those of others in a technical paper entitled "Engineering Principles of Weight-Equalizing and Sway Resistant Hitches" which he delivered at a Society of Automotive Engineers Regional Meeting in Toledo, Ohio on Apr. 13, 1964.

SUMMARY

Commencing broadly with basic equalizing structural components, improvements in such components have been made and new components have been incorporated to provide a trailer hitch which more effectively hitches towed vehicles to towing vehicles during over road travel as road clearance is kept at a maximum and swaying and rocking tendencies are kept at a minimum. Moreover, this improved trailer hitch is more effectively and conveniently installed, removed and adjusted. The equalizing arms are easily secured and released even though the towed and towing vehicle are hitched together solely by ball and socket structure.

The trailer hitch joins a powered vehicle to a towed vehicle using components which cooperatively result in:

(1) Controllable transfer of some of the towed vehicle weight to forward wheels of a powered vehicle by using load equalizing spring-torsion bar arms;

(2) Effective additional damping of forces created by towed vehicle motion, by incorporating torque arms into reversible flexure spring-torsion bar arm assemblies;

(3) Improved turning radius of hitch-combined vehicles because of greater clearances afforded as torque arms are used to locate spring-torsion bar arms inboard of V-tongue structure of the towed vehicle, and yet conveniently position flexible tension members which extend between these torque arms and outboard portion of the V-tongue structure;

(4) Better clearance of hitch-combined vehicles as spring-torsion bar assemblies incorporating torque arms are mounted longitudinally directly into a head or ball mount interconnector which supports a conventional ball; and (5) Easier attachment, detachment, and adjustment of over-all hitch is possible with spring-torsion bar arms being insertable and adjustable whether or not the full tongue load weight of the towed vehicle is resting on a conventional ball assembly when it is removably secured to a powered vehicle.

INVENTION

This invention concerns improvements made in extending this prior art of equalizing hitches. As set forth in the summary, at least five improvements are now being offered motorists who tow their camping trailers, boats and/or freight trailers over all types of roadways under different loading conditions. These improvements are described, following a summary of basic equalizing hookups, under following headings as they specifically refer to a preferred embodiment illustrated in the accompanying drawings wherein:

FIGURE 1 is a top view of the preferred embodiment of the trailer hitch as installed on and between frame members of both towing and towed vehicles;

FIGURE 2 is a side view of the trailer hitch and vehicle framing illustrated in FIGURE 1, with dotted lines indicating the pre-load position of the spring-torsion bar arm assemblies;

FIGURE 3 is a partial section view taken on line 3—3 of FIGURE 2, showing the transverse positions of the spring-torsion bar arm assemblies positioned below the V-tongue structure of the towed vehicle;

Figure 11:
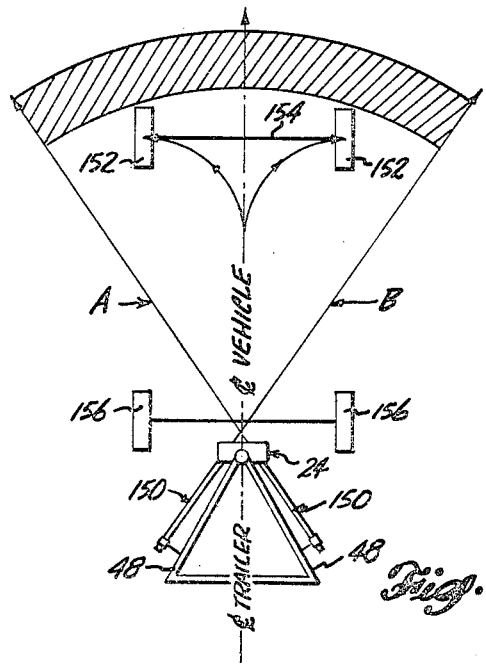
Figure 12:
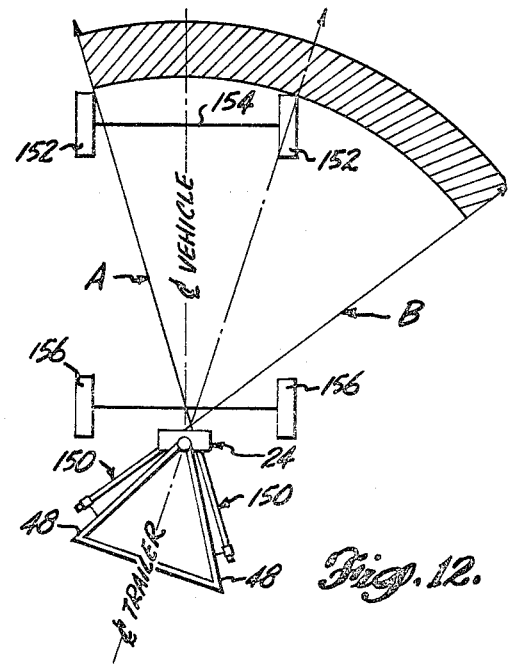
Figure 13:
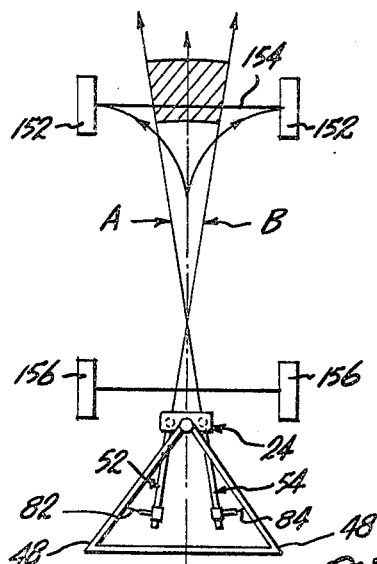
Figure 14:
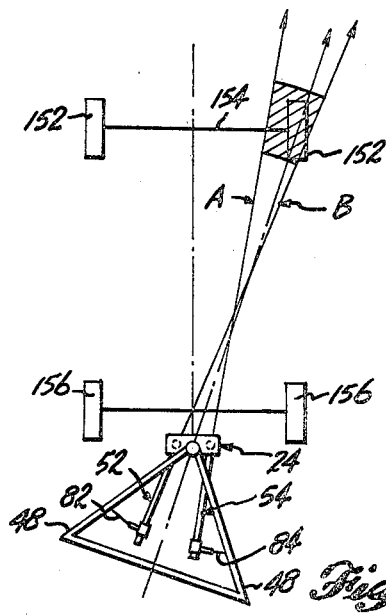

FIGURE 4 is a partial perspective view of parts connected to and located nearby the head or ball mount interconnector which is joined indirectly to the frames of the towed and towing vehicle and which supports the conventional ball and receives the forward ends of the spring-torsion bar arms, one arm being illustrated as installed and the other arm being illustrated as transversely moving into its secured position as indicated by the motion arrow;

FIGURES 5, 6, 7, 8, 9 and 10 progressively show how a spring-torsion bar arm is installed, commencing with its transverse movement depicted in FIGURE 4, followed by tilting and then righting movements indicated by motion arrows in FIGURES 5, 6, 7, 8 and 9. FIGURES 5, 6 and 7 indicate such movements in partial exterior views and FIGURES 7, 9 and 10 indicate such movements and results thereof in partial sectional views;

FIGURES 11 and 12 diagrammatically indicate how a conventional equalizing hitch may create forces which cause excessive swaying and rocking motions of the towing vehicle, feed back forces for straight away tows being shown in FIGURE 11 and those in a left turn being shown in FIGURE 12, and;

FIGURES 13 and 14 indicate diagrammatically how placement of spring-torsion bar arms may create forces which cause limited swaying and rocking motions of the towing vehicle, feed back forces for straight away tows being shown in FIGURE 13 and those in a left turn being shown in FIGURE 14.

BASIC EQUALIZING HITCHING CONNECTIONS

In installing equalizing load hitches of all types, framing of a power vehicle is generally strengthened and/or extended 20, as shown in FIGURES 1 and 2. Then a hollow draw bar 22 of square or rectangular cross section is welded to this extended vehicle framing 20. An interconnector assembly 24 is inserted into hallow draw bar 22 and so held by a locking shear pin 26. It in turn is held in place by pre-bending one of its ends 28 and securing the other end 30 by a safety pin 32.

This inserted end 34 of interconnector assembly 24 is greater in length than the hollow receiving interior of draw bar 22. Where it remains clear 36, it is welded to a transverse ball mount interconnector body 38 which at its top detachably receives a conventional ball 40 that is held in place by a conventional threaded fastening means not shown.

A ball socket structure 42 with its pivotal handle 44 and attached spherical locking section, not shown, after welding to V tongue structure 48 of towed vehicle framing, not shown, is conveniently dropped into place over ball 40 to complete the conventional hitching of towed and towing vehicles, not shown. At the conclusion of this hitching, the rear of a powered vehicle is generally excessively lowered as most of the towed vehicles forward weight bears down until the resistance offered primarily by the powered vehicles rear suspension system is fully activated.

Then regarding this invention to acquire basic equalization, or nearly so, by shifting towed vehicle weight both back on the towed vehicle wheels and forward to front wheels of a powered vehicle, spring-torsion bar arm assemblies 52, 54 are used on each side of a center line which passes through the center of the V tongue structure 48, as shown in FIGURE 1. These assemblies 52, 54, are connected, as will be more fully described later, by pivotally connecting them at their forward couplet ends 56, 58, to axially aligned protruding top pins or lugs 60 extending down on both sides from a top transverse flange 62 of a ball mount interconnector body 38 and to protruding lower pins or lugs 64, projecting up on both sides from a bottom transverse flange 66 also of a ball mount interconnector body 38. At their rear ends 70, 72 they are secured indirectly to V tongue structure 48 through clamped on tensioned sub assemblies 76, 78, as will be more fully described later. As known and observed in regard to all past equalizing trailer hitches and this one illustrated in FIGURES 1 and 2, after spring torsion-bar arm assemblies, or equalizing arm or bar assemblies, in the position of assemblies 52, 54, are pivotally mounted, the subsequent raising of their rear ends 70, 72 and attachment to V tongue structure 48, transfers the effect of towed vehicle weight. Some of its weight is shifted to forward wheels of a powered vehicle, not shown. As a result of this principle longitudinal shifting of such weight, both towed and towing vehicles become closer to their respective longitudinal level positions and handling of the connected vehicles is much improved through this basic equalizing hitching connection.

Preloading torque energy supplements spring bar energy by using outwardly extending torque levers of spring-torsion bar arm equalizing assemblies Outwardly extending torque lever sub assemblies 82, 84 are selectively positioned at their transverse extended and cutout ends 86 over equalizing bars 88 at or near their respective rear ends 70, 72 of left and right equalizing assemblies 52, 54. Captive projecting pins or welds 92 keep them from sliding off during assembly. Once installed and under tension and torque loading, torque levers 82, 84 firmly remain in place on bars 88. The extending torque lever body portions 96 of each torque lever sub assembly 82 or 84, terminates in a hook 100 which securely fits a selected chain length 102 of a tension chain 104. Each chain 104 is also fitted above to an over center toggle action hook sub assembly 108 or 110 which are, in turn, clamped to V tongue structure 48 by an overlay bracket 112 set screwed 114 in place substantially directly over hook 100 on each torque lever sub assembly 82 or 84. The raising rotational movement of yokes 116 about their pivotal mounting on projecting bearing ears 118, tension the chains 104 secured on the yoke carried hooks 120.

A keeper or safety loop wire 121 is used to retain yoke 116 and its hook 120 in place. The keeper 121 is fitted around the shank of set screw 114 and then it is removably placed down over and partially around a lever bar receiver 119 which in turn is welded to yoke 116 opposite hook 120. The use of a hitching and unhitching lever bar tool (not shown) aids a person in securing and releasing the over center toggle assemblies 108 and 110. Upon normal designed tensioning, by using these toggle action hook sub-assemblies 108, 110, torque lever body portions 96 extend outwardly and substantially horizontally. In such static coupled position before driving away, equalizing bars 88 are pre-loaded with torque energy and spring energy which is used effectively to always longitudinally transfer the vehicle weights.

Nearer centerline positioning results by using outwardly extending torque levers of spring-torsion bar arm equalizing assemblies Moreover, as illustrated in FIGURES 11, 12, 13 and 14, the "nearer centerline positioning" of equalizing bars 88 and their attachments as shown in FIGURES 13 and 14, in contrast to the conventional equalizing hook up positions shown in FIGURES 11 and 12, results in a very effective avoidance of excessive feed back forces, which otherwise might cause excessive rocking and swaying of the towing vehicle and the reverberations thereof recycling back into the towed vehicle.

Conventional equalizing arm assemblies 150 are located below and/or outward of V tongue structure 48 of a towed vehicle (not shown). Therefore as illustrated in FIGURE 11, reference indicating lines A and B extending in line from assemblies 50, create a wide action sector which includes location of the front wheels 152 and axle 154 of a towing vehicle (not shown). As tipping and swaying motions of a towed vehicle occur, one or the other of conventional equalizing arm assemblies 150 is feeding forces back into the towing vehicle which are derived from trailer weight adjustments and "over the road" shifting of these weights. As the towing and towed vehicles enter a turn as depicted in FIGURE 12, the wide action sector of these feed back forces as indicated by the reference lines A and B moves to the outside of the turn. The resultant force, then applied at the interconnector assembly 24, which is active between illustrative reference indicating lines A and B becomes more effective in producing unwanted rocking and swaying of a car frame (not shown) positioned over front wheels 152 and rear wheels 156.

In contrast, as illustrated in FIGURES 13 and 14, positioning of torque lever sub-assemblies 82, 84 places their respective spring-torsion bar assemblies 52, 54 much nearer a center line of a towed vehicle. As a consequence, the action sector between illustrative indicating reference lines A and B is much narrower. The resultant feed back force being applied at any time at the interconnector is much less effective in producing unwanted rocking and swaying of a car frame (not shown). On a turn, as shown in FIGURE 14, the improvement is a major one in reducing the overturning, swaying and rocking effectiveness of any resultant force derived from supporting and shifting towed vehicle weights during over road travel.

Turning radius is improved by using outwardly extending torque levers of spring-torsion bar arm equalizing assemblies Also, there is another operational advantage gained by locating torque lever body portions 96 in their horizontal positions as shown in FIGURES 1 and 3, to position equalizing bars 88 well inboard of V tongue structure 48 at their rear ends 70, 72. Because most portions of these equalizing bars 88 are then located closer to the center of V tongue structure, they do not cause any substantial reduction in the turning radius of the connected vehicles.

As so arranged with outwardly extending torque levers, these spring-torsion arm assemblies perform all the conventional equalizing functions and do so with these important added operational advantages of: having two way flexing of spring or equalizing bars 88, reducing swaying and rocking forces, and assuring maximum clearance upon turning. Also greater over road clearance and convenience in securing and removing equalizing arms are realized when these spring-torsion bar arm assemblies 52, 54 are constructed and used as further explained.

Convenient side tilting installation of equalizing arms near vertical center of the ball mount interconnector These advantages of equalization, reduction of swaying and rocking, and better turning clearances, are all accomplished by using the arrangement of components as shown in FIGURES 1 and 2 which moreover results in providing maximum road clearance. Forward ends 56, 58 of spring-torsion bar arm assemblies 52, 54 are first pivotally secured each with a couplet 56, 58 at their highest possible elevation. Thereafter their equalizing bars 88, when under tension, extend rearwardly at or almost at this same elevation above a road bed as indicated in FIGURE 2.

At all times whether before or after the towed vehicle tongue weight is being transferred to the towing vehicle the equalizing bars or arms 88 are conveniently installed never being hindered by restrictive clearances above the road bed. The arrangement of structures and movements of structures making such installation so convenient at any time and under any condition is illustrated, more particularly, throughout FIGURES 4 and 10.

FIGURE 4 is a partial perspective view of the components attached to and by interconnector assembly 24 with one equalizing bar or arm 88 yet to be connected. A motion arrow indicates how its prepared pivotal mounted front couplet end is moved in the general direction of the ball mount interconnector body 38. FIGURES 5, 6 and 7 show how such mounting motions are continued until the connected position is reached as illustrated in FIGURES 8, 9 and 10.

To facilitate this convenient connection, each equalizing bar or arm 88 is fitted with an end encompassing couplet fitting 122 having hollow square opening structure 124 which is securely held in place by shear pins or weldments 126. Such hollow square opening structure 124, after providing a receiving space for a forward end of an equalizing bar or arm 88, is then formed to provide a hollow cylindrical bearing housing structure 128 projecting beyond bar structure 124 to provide a clearance structure 130, having an axis which is transverse to equalizing bar or arm 88 and substantially vertical after installation. The internal diameter of cylindrical bearing structure 128 is just large enough to fit over top and lower axial bearing pins or lugs 60 and 64.

In order to so position cylindrical bearing structure 128 of couplet 122 conveniently over these axial bearing pins or lugs 60, 64 in such captive position, by first approaching from respective sides of the hitch assembly, selective portions of cylindrical bearing structure 128 of couplet 122 are carefully removed to provide such clearance. Care is required for such removal must occur without decreasing the structural integrity of pins or lugs 60, 64 and bearing structure 128 where these structures are pivotally bearing against one another during all maneuvers of the hitched towing and towed vehicles. Furthermore, once in position, each cylindrical structure of the couplet must remain fully secured between top and lower flanges 62, 66 of the ball mount interconnector body 38 with respect to any possible potentially excessive movements of components caused by rough road or off road conditions.

The bottom of each cylindrical bearing structure 128 of couplet 122 is beveled downwardly and inwardly on the outwardly portion 132 along a chord length 134 which is tangent to the cross sectional internal diameter of bearing structure 128 as shown in FIGURES 7, 8 and 10. Such lower outside beveled portion 132 permits the initial tilted insertion of the bottom of cylindrical bearing structure 128 of couplet 122 over a lower pin or lug 64 as illustrated in FIGURES 5 and 6.

However, as quickly noticeable in FIGURE 6, top inner portions must also be beveled 140 and in addition a section must be removed or not provided in the first instance, to form a gateway 142 for receiving top pin or lug 60 into cylindrical bearing structure 128 of couplet 122 as the latter is tilted upright into its over-road operating position in axial alignment with pivot pins or lugs 60, 64. When so formed, tilting and sidewise movement of bearing structure 128 of couplet 122, as equalizing arms 88 are being installed, is undertaken conveniently as shown in FIGURES 4, 5 and 6 and 8. In its resulting position cylindrical bearing structure 128 of couplet 122 is well secured about pins or lugs 60, 64 and between top and lower flanges 62, 66 of ball mount interconnector body 38, with substantial structural portions well positioned to withstand all operating structural loads. The continuity of all structure receiving and transmitting the towing and hitching forces is clearly shown in FIGURE 10, when the spring-torsion bar arm assemblies 52, 54 are fully installed. Lower pins or lugs 64 are always fully surrounded by the cylindrical bearing structures 128 of couplet 122. Top pins or lugs 60, although not completely surrounded, because of gateway 142, are so positioned to be fully captive with respect to all possible operational loads when spring-torsion bar arm assemblies 52, 54 are fully installed.

I claim:

1. A trailer hitch adapted to conveniently and quickly join a towing vehicle to a towed vehicle and in so doing to readjust weight distributions of these connected vehicles by interconnecting weight equalizing structural components which transmit smaller swaying and rocking forces and which do not restrict tight turn capabilities comprising:
    (a) a ball mount interconnector with means for attachment to a towing vehicle, means for attachment to equalizing spring-torsion bar arm assemblies, means for attachment to a ball connector and ball socket assembly;
    (b) an assembly of a ball connector and ball socket, the ball connector adapted to be secured to the ball mount interconnector and the ball socket adapted to be secured to a tongue of a towed vehicle;
    (c) equalizing spring-torsion bar arm assemblies comprising, in turn, equalizing arms, forward end pivotal bearing housing couplets mounted on the equalizing arms for engagement at the front with the ball mount interconnector, and torque lever bodies mounted on the rear ends of the equalizing arms; and
    (d) an adjustable tensioning means adapted to connect the torque lever bodies to a tongue of a towed vehicle and thereby to connect the rear of the equalizing spring-torsion bar assemblies to a tongue of a towed vehicle.

2. In claim 1, the forward pivotal bearing housing couplets which are mounted on the equalizing arms are beveled and formed with a gateway to accommodate their transverse tilting insertion into the ball mount interconnector which in turn is provided with aligned axis bearing lugs on its top and bottom flanges.

3. In claim 1, the ball mount interconnector means for attachment to equalizing spring-torsion bar arm assemblies is positioned to receive and to hold the pivotal bearing housing couplets which are secured on the forward ends of the equalizing arms, as high as possible, yet below the elevation of the ball connector, to provide maximum road clearance under the equalizing spring-torsion bar arm assemblies and all other trailer hitch components.

4. In claim 1, the torque lever bodies, during installation of the trailer hitch, are rotated and ultimately positioned horizontally upon installation, placing their included hook at their outward ends to be interfitted with the above adjustable tensioning member and thereby to position the rear ends of the equalizing arms nearer the centerline of the tongue of the towed vehicle providing better clearance during turns of components of the equalizing spring-torsion bar arm assemblies.

5. In claim 4, the torque lever bodies are of sufficient length to position the rear ends of the equalizing arms near enough to the centerline of the V tongue of the towed vehicle so the entire equalizing spring-torsion bar arm assemblies are not located in a position to feed back towed vehicle created forces at excessive angular directions relative to the direction of motion of the towing vehicle thereby avoiding excessive swaying and overturning feed back forces.

6. An improvement in an equalizing load trailer hitch used to join a towing vehicle to a towed vehicle where the towed vehicle has a tongue structure and the trailer hitch has receiving means located where it is joined to the towing vehicle, also it has spring arms which converge and are secured in these receiving means, and in addition it has adjustable tensioning means secured between the tongue and the spring arms, wherein the improvement comprises torque lever structure secured to the ends of the spring arms and extending transversely and outwardly therefrom to be secured to the adjustable tensioning means thereby positioning the spring arms closer to the center line of the tongue of the towed vehicle and also serving as the source of creating a resistive torque in the resulting spring arm and torque lever assembly which beneficially reacts to distribute the loads between towing and towed vehicles and to control swaying tendencies while at all times maintaining overall road clearance.

7. An improvement in an equalizing load trailer hitch used to join a towing vehicle to a towed vehicle where the towed vehicle has a tongue structure and the trailer hitch has receiving means located where it is joined to the towing vehicle, also it has spring arms which converge and are secured in these receiving means, and in addition it has adjustable tensioning means secured between the tongue and the spring arms, wherein the improvement comprises, top and bottom lugs in each receiving means and lug accommodation cammed entry recesses on the couplets of the spring arms only permitting installation of the spring arms into the receiving means if each spring arm is first initially moved transversely while tilted and once in place over the lugs is tilted back upright and rotated nearer the tongue structure where each arm so installed remains securely locked in place for and during towing, until after towing it may be moved back to its traverse position where it is tilted during its removal.

8. A trailer hitch adapted to conveniently and quickly join a towing vehicle to a towed vehicle and in so doing to readjust weight distributions of these connected vehicles by interconnecting weight equalizing structural components which transmit smaller swaying and rocking forces and which do not restrict tight turn capabilities comprising:
  (a) an interconnector with means for attachment to a towing vehicle and means for attachment to a towed vehicle;
  (b) equalizing spring-torsion bar arm assemblies comprising, in turn, equalizing arms, forward end pivotal bearing housing couplets mounted on the equalizing arms for engagement at the front with the interconnector, and torque lever bodies mounted on the rear ends of the equalizing arms; and
  (c) a tensioning means adapted to connect the torque lever bodies to a tongue of a towed vehicle and thereby to connect the rear of the equalizing spring-torsion bar assemblies to a tongue of a towed vehicle.

References Cited

UNITED STATES PATENTS

| 2,793,878 | 5/1957 | Toland | 280—406 |
| 2,952,475 | 9/1960 | Reese | 280—406 |
| 3,185,499 | 5/1965 | Reese | 280—406 |
| 3,194,584 | 7/1965 | Reese | 280—406 |
| 3,331,161 | 7/1967 | Head et al. | 280—406 |

LEO FRIAGLIA, Primary Examiner